US008732272B2

(12) United States Patent
Deshpande et al.

(10) Patent No.: US 8,732,272 B2
(45) Date of Patent: May 20, 2014

(54) METHODS AND APPARATUS FOR OBTAINING INTEGRATED CONTENT FROM MULTIPLE NETWORKS

(75) Inventors: Manoj M. Deshpande, San Diego, CA (US); Michael M. Fan, Beijing (CN); Roger W. Martin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 478 days.

(21) Appl. No.: 12/569,748

(22) Filed: Sep. 29, 2009

(65) Prior Publication Data

US 2011/0078376 A1 Mar. 31, 2011

(51) Int. Cl.
*G06F 15/16* (2006.01)
(52) U.S. Cl.
USPC ........... 709/218; 709/206; 709/223; 709/217; 455/404.1; 455/404.2
(58) Field of Classification Search
USPC ....................................................... 709/228
See application file for complete search history.

(56) References Cited

U.S. PATENT DOCUMENTS

| | | | | |
|---|---|---|---|---|
| 2002/0160745 A1* | 10/2002 | Wang | ............................. | 455/404 |
| 2002/0174184 A1* | 11/2002 | Bouchard | ...................... | 709/206 |
| 2003/0038849 A1* | 2/2003 | Craven et al. | .................. | 345/864 |
| 2003/0078986 A1* | 4/2003 | Ayres et al. | .................... | 709/217 |
| 2005/0021725 A1* | 1/2005 | Lobbert | ........................ | 709/223 |
| 2006/0172746 A1* | 8/2006 | Kaplan | ....................... | 455/456.3 |
| 2006/0194587 A1 | 8/2006 | Sharony et al. | | |
| 2006/0223518 A1* | 10/2006 | Haney | ........................... | 455/420 |
| 2008/0091939 A1 | 4/2008 | Golden | | |
| 2008/0248813 A1 | 10/2008 | Chatterjee | | |

FOREIGN PATENT DOCUMENTS

| | | |
|---|---|---|
| CN | 1663206 A | 8/2005 |
| CN | 101056276 A | 10/2007 |
| CN | 101247563 A | 8/2008 |
| CN | 101356770 A | 1/2009 |
| WO | WO03092319 | 11/2003 |

OTHER PUBLICATIONS

International Search Report and Written Opinion—PCT/US2010/050590, International Search Authority—European Patent Office—Dec. 8, 2010.

* cited by examiner

*Primary Examiner* — Hua Fan
(74) *Attorney, Agent, or Firm* — Fulbright & Jaworski LLP (57) ABSTRACT

A method and apparatus for obtaining location content from multiple networks is disclosed. The method may comprises: obtaining coarse location content at a wireless communication device (WCD) from a first network using a first protocol, wherein the coarse location content includes information defining locations of geographic coverage regions for one or more second networks which use a second protocol, obtaining WCD location information, determining from the WCD location information and the coarse location content if the WCD is within the geographic coverage region of a second network, accessing the determined second network using the second protocol, receiving from the accessed second network fine location content, and generating an integrated location content item by combining the coarse location content with the fine location content.

13 Claims, 7 Drawing Sheets

FIG. 7

METHODS AND APPARATUS FOR OBTAINING INTEGRATED CONTENT FROM MULTIPLE NETWORKS

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Further, wireless communication systems can include multiple area networks with varying coverage and capacity. For example, wireless wide area networks (WWANs) provide expansive coverage at slower data rates, while wireless local area networks (WLANs) provide comparatively higher data rates over comparatively smaller coverage regions.

As the use of wireless communications device (WCD) to access multimedia content increases, limitations on WLANs and WWAN hampers a user's ability to access multimedia content of interest. Thus, improved apparatus and methods for obtaining integrated location specific content from multiple networks are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with obtaining location content from multiple networks. According to one aspect, a method for obtaining location content from multiple networks is provided. The method may include obtaining coarse location content at a wireless communication device (WCD) from a first network using a first protocol, wherein the coarse location content includes information defining locations of geographic coverage regions for one or more second networks which use a second protocol. Further, the method may include obtaining WCD location information. Still further, the method may include determining from the WCD location information and the coarse location content if the WCD is within the geographic coverage region of at least one of the one or more second networks. Yet further, the method may include accessing the at least one determined second network using the second protocol upon a determination that the WCD is located within the geographic coverage region of at least one of the one or more second networks. Additionally, the method may include receiving fine location content from the at least one accessed second network. Moreover, the method may include generating an integrated location content item by combining the coarse location content with the fine location content.

Still another aspect relates to a computer program product comprising a computer-readable medium. The computer program product may include a computer-readable medium including a first set of codes for causing a computer to obtain coarse location content at a wireless communication device (WCD) from a first network using a first protocol, wherein the coarse location content includes information defining locations of geographic coverage regions for one or more second networks which use a second protocol. The computer program product may further include a computer-readable medium including a second set of codes for causing the computer to obtain WCD location information. The computer program product may still further include a computer-readable medium including a third set of codes for causing the computer to determine from the WCD location information and the coarse location content if the WCD is within the geographic coverage region of at least one of the one or more second networks. The computer program product may still further include a computer-readable medium including a fourth set of codes for causing the computer to access the at least one determined second network using the second protocol upon a determination that the WCD is located within the geographic coverage region of at least one of the one or more second networks. The computer program product may still further include a computer-readable medium including a fifth set of codes for causing the computer to receive fine location content from the at least one accessed second network. Moreover, the computer program product may include a computer-readable medium including a sixth set of codes for causing the computer to generate an integrated location content item by combining the coarse location content with the fine location content.

Yet another aspect relates to an apparatus. The apparatus may include means for obtaining coarse location content at a wireless communication device (WCD) from a first network using a first protocol, wherein the coarse location content includes information defining locations of geographic coverage regions for one or more second networks which use a second protocol. The apparatus may further include means for obtaining WCD location information. The apparatus may still further include means for determining from the WCD location information and the coarse location content if the WCD is within the geographic coverage region of at least one of the one or more second networks. The apparatus may yet further include means for accessing the at least one determined second network using the second protocol upon a determination that the WCD is located within the geographic coverage region of at least one of the one or more second networks. Additionally, the apparatus may include means for receiving fine location content from the at least one accessed second network. Moreover, the apparatus may include means for generating an integrated location content item by combining the coarse location content with the fine location content.

Another aspect relates to an apparatus. The apparatus may include a communication module for obtaining coarse location content at a wireless communication device (WCD) from a first network using a first protocol, wherein the coarse location content includes information defining locations of geographic coverage regions for one or more second networks which use a second protocol, and obtaining WCD location information. Further, the apparatus may include a location content module for determining from the WCD location information and the coarse location content if the WCD is within the geographic coverage region of at least one of the one or more second networks, and upon a determination that the WCD is located within the geographic coverage region of at least one of the one or more second networks, accessing the at least one determined second network using the second protocol. Additionally, the apparatus communication module may further be operable for receiving fine location content from the at least one accessed second network. Moreover, the apparatus location content module may further be operable for generating an integrated location content item by combining the coarse location content with the fine location content.

Furthermore, in accordance with one or more aspects and corresponding disclosure thereof, various aspects are described in connection with providing multiple layer location content to a WCD. According to one aspect, a method for providing multiple layer location content to a WCD is provided. The method may include receiving, at a first network server, fine location content information from one or more second network servers, wherein the fine location content information includes access information and a geographic coverage region of each of the one or more second network servers. Additionally, the method may include generating an integrated location content item by combining the received fine location content information with coarse location content information associated with the first network server. Moreover, the method may include transmitting the integrated location content item to a WCD.

Still another aspect relates to a computer program product comprising a computer-readable medium. The computer program product may include a computer-readable medium including a first set of codes for causing a computer to receive, at a first network server, fine location content information from one or more second network servers, wherein the fine location content information includes access information and a geographic coverage region of each of the one or more second network servers. The computer program product may further include a computer-readable medium including a second set of codes for causing the computer to generate an integrated location content item by combining the received fine location content information with coarse location content information associated with the first network server. The computer program product may still further include a computer-readable medium including a third set of codes for causing the computer to transmit the integrated location content item to a WCD.

Yet another aspect relates to an apparatus. The apparatus may include means for receiving, at a first network server, fine location content information from one or more second network servers, wherein the fine location content information includes access information and a geographic coverage region of each of the one or more second network servers. The apparatus may further include means for generating an integrated location content item by combining the received fine location content information with coarse location content information associated with the first network server. Moreover, the apparatus may include means for transmitting the integrated location content item to a WCD.

Another aspect relates to an apparatus. The apparatus may include a communication module for receiving, at a first network server, fine location content information from one or more second network servers, wherein the fine location content information includes access information and a geographic coverage region of each of the one or more second network servers. Further, the apparatus may include a location content module for generating an integrated location content item by combining the received fine location content information with coarse location content information associated with the first network server. Moreover, the apparatus communication module may further be operable for transmitting the integrated location content item to a WCD.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, a user of a wireless communications device may access location relevant information including varying levels of detail, at least partially depending on access to local content networks providing relevant content for the local area, also referred to as fine location content. Fine location content is used herein relative to coarse location content, where the fine location content corresponds to a substantially smaller local area or local area network (LAN) as opposed to the coarse location content, which corresponds to a wider area or wide area network (WAN). Further, the fine location content may have a first size substantially larger than a second size of the coarse location content. As such, a user may access fine location content while in the vicinity of specific points of interest and may access coarse location content elsewhere. Further, such coarse location content may provide a user with information that allows the user to locate areas in which fine location content may be accessed. As such, the present aspects may efficiently provide the fine location content to a device using the relatively higher bandwidth available via a LAN when the device is in a vicinity of an area where the fine location content can be accessed, thereby avoiding unnecessary network transmission cost or device storage costs. Additionally, based on obtaining both the coarse location content and the fine location content, a wireless device is operable to generate an integrated content item that comprises at least a portion of both the coarse location content and the fine location content. For example, the integrated location content item may represent various layers of content, where each layer may correspond to a different one of one or more coarse location content and fine location content. Thus, the described aspects integrate different type of content, as well as integrating services from different types of networks.

Figure 1:
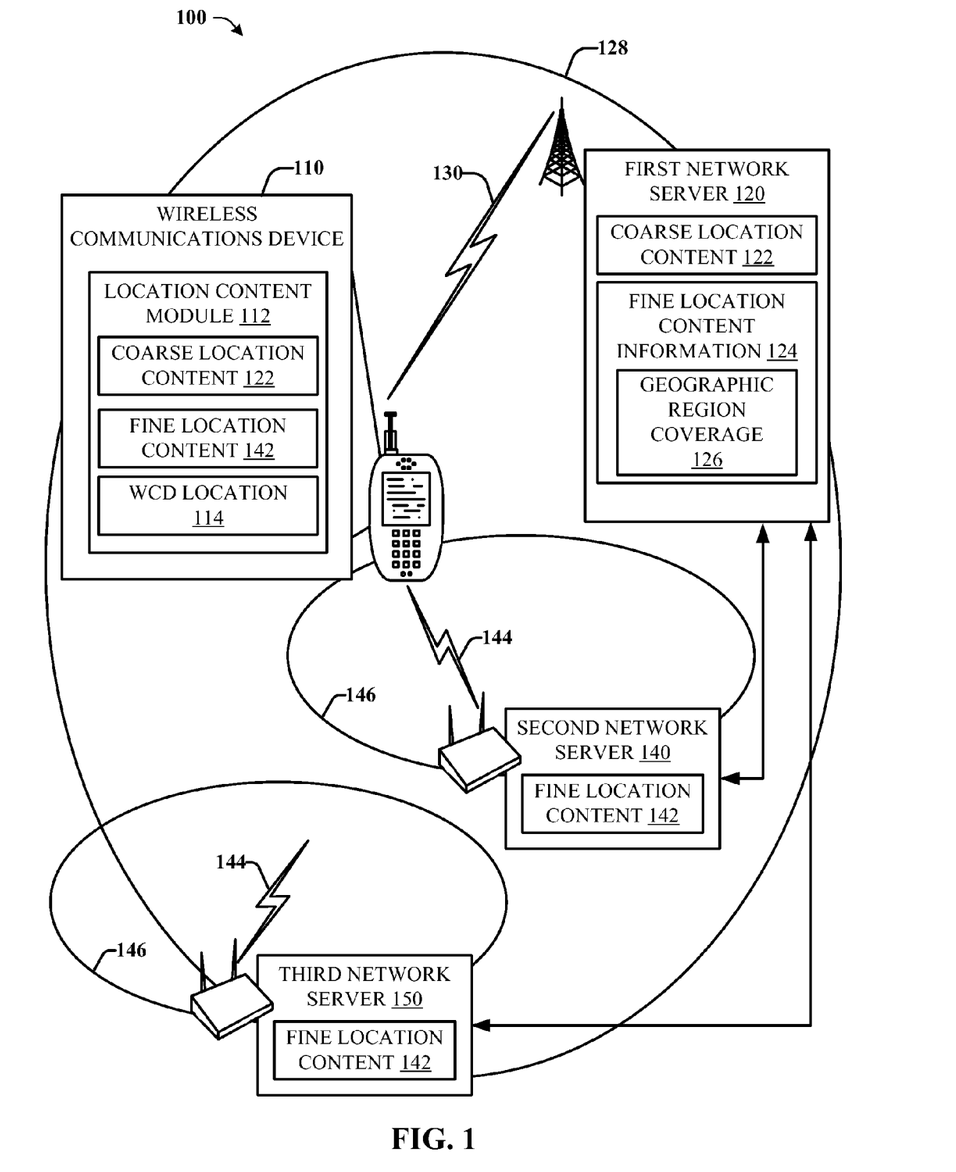
FIG. 1 illustrates a block diagram of a communication network according to an aspect.

With reference to FIG. 1, a block diagram of a communication network 100 according to an aspect is illustrated. Communication network 100 may include wireless communications device (WCD) 110 communicatively coupled to at least a first network associated with a first network server 120. In one aspect, WCD 110 may be communicatively coupled to one or more second networks associated with content servers, such as second and third network servers (140, 150). In one aspect, the first network may have a first coverage region 128 and may communicate with WCD 110 using a first protocol 130. In such an aspect, the first network and protocol may include a WWAN using: CDMA, WCDMA, TDMA, TD-SCDMA, UMTS, IP, GSM, LTE, WiMax, UMB, EV-DO, etc. In another aspect, the second network may have one or more second coverage regions 146 and may communication with WCD 110 using a second protocol 144. In such an aspect, the second network and protocol may include a WLAN using: 802.xx wireless LAN, or BLUETOOTH, etc.

In operation, WCD 110 may be located within the first network coverage region 128 and may obtain coarse location content 122 from first network server 120. In one aspect, obtaining coarse location information further may include receiving the coarse location content periodically from first network server 120 using first protocol 130. In another aspect, the coarse location content 122 may further include: regional event information, regional map information, regional weather information, or regional traffic information, etc. Still further, the course location content information 124 may be obtained that includes indications 126 of geographic regions in which fine location content may be accessed. The WCD 110 may determine whether its current located in a second network coverage region 146 by using WCD location module 114. In such a case, WCD 110 may access fine location content 142 from a second network server 140 using a second protocol 144. In one aspect, the fine location content 142 may include: specific event information, local map information, specific weather event information, specific traffic event information, etc. In another aspect, fine location content 142 may be received and stored while the WCD 110 is within the second network coverage region 146 so as to allow access thereafter. Further, fine location content 142 and coarse location content 122 may be combined by location content module 112 to provide a user with integrated location content.

Accordingly, wireless communications device 110 may access coarse and fine location content items in certain regions based at least in part on communications with a first network server 120 and second and/or third network servers (140, 150).

Figure 2:
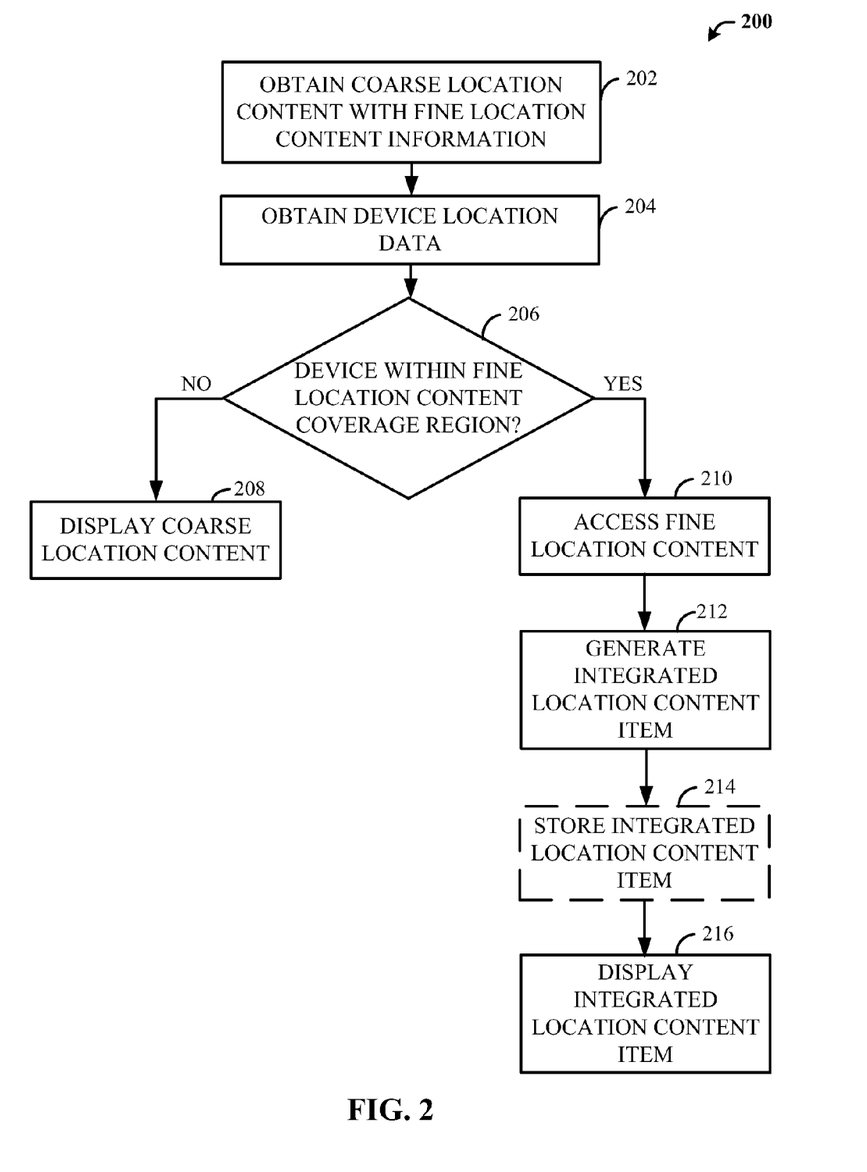
FIG. 2 is a flowchart of an aspect of a communication network depicting obtaining location content from multiple networks.

FIG. 2 illustrates various methodologies 200 in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 2, at reference numeral 202, coarse location content is obtained by a WCD. In one aspect, coarse location content may be obtained from a first network using a first protocol, and the coarse location content may further include information defining locations of geographic coverage regions for one or more second networks which use a second protocol. In one aspect, obtaining coarse location information further may comprise receiving the coarse location content to the WCD periodically from the first network using a first protocol. In another aspect, obtaining coarse location information further may comprise: requesting, by the WCD, to the first network the coarse location content, and receiving the requested coarse location content from the first network using a first protocol. In yet another aspect, the coarse location content may further include at least one of: regional event information, regional map information, regional weather information, or regional traffic information. For example, a user access a WWAN based network to obtain information, such as the location and time of a sporting event. In such an exemplary case, the use may obtain general (coarse) information about the location and the event. Further, the received content may indicate locations in which more detailed content is accessible.

At reference numeral 204, the location of the device is obtained. In one aspect, the obtaining WCD location information may further comprise at least one of: receiving the WCD location information from a location sensor associated with the WCD, receiving the WCD location information from a user input, requesting the WCD location information from the first network, receiving the requested WCD location information, etc.

At reference numeral 206 it is determined whether the device is located within a region covered by one or more of the second networks. If at reference numeral 206, the WCD is not within a region covered by a second network, then at reference numeral 208, only coarse location content obtained from the first network is made available to a user. By contrast, if at reference numeral 206, it is determined that the device is located within a region covered by one or more of the second networks, then at reference numeral 210, fine location content may be access from the one or more accessible second networks. Continuing the above example, assuming the user is located near the sport event location, the user may have access to at least one second network associated with the location, such as, eatery menu information, sporting team statistics, hotel room availability, video clips of previous events, etc.

At reference numeral 212 an integrated location content item may be generated by combining coarse location content information and the obtained fine location content information. At reference numeral 214, in one aspect, integrated location content information may be stored on a WCD. In such an aspect, storage of location content may include temporary caching, and/or more permanent storage options. Such options may be user defined, a default setting on the WCD, network defined, etc.

At reference numeral 216, integrated location content may be displayed to a user. In operation, the coarse location and fine location content may be accessed contemporaneously. In one aspect, the content may be accessed through the network from which the material was made available and using the protocol used to obtain the selected location content item. For example, continuing the above example, a user may access information at the streets surrounds the sporting event from the coarse location information through the first network service and using a WWAN network to access the selected information. Further, a user may access nutritional information about a menu item at one of the eateries at the sport event location from the second network and using a WLAN network to access the selected information. In another aspect, when a WCD in with the coverage region of a WLAN coarse and fine location content may be obtained through the WLAN network.

Figure 3:
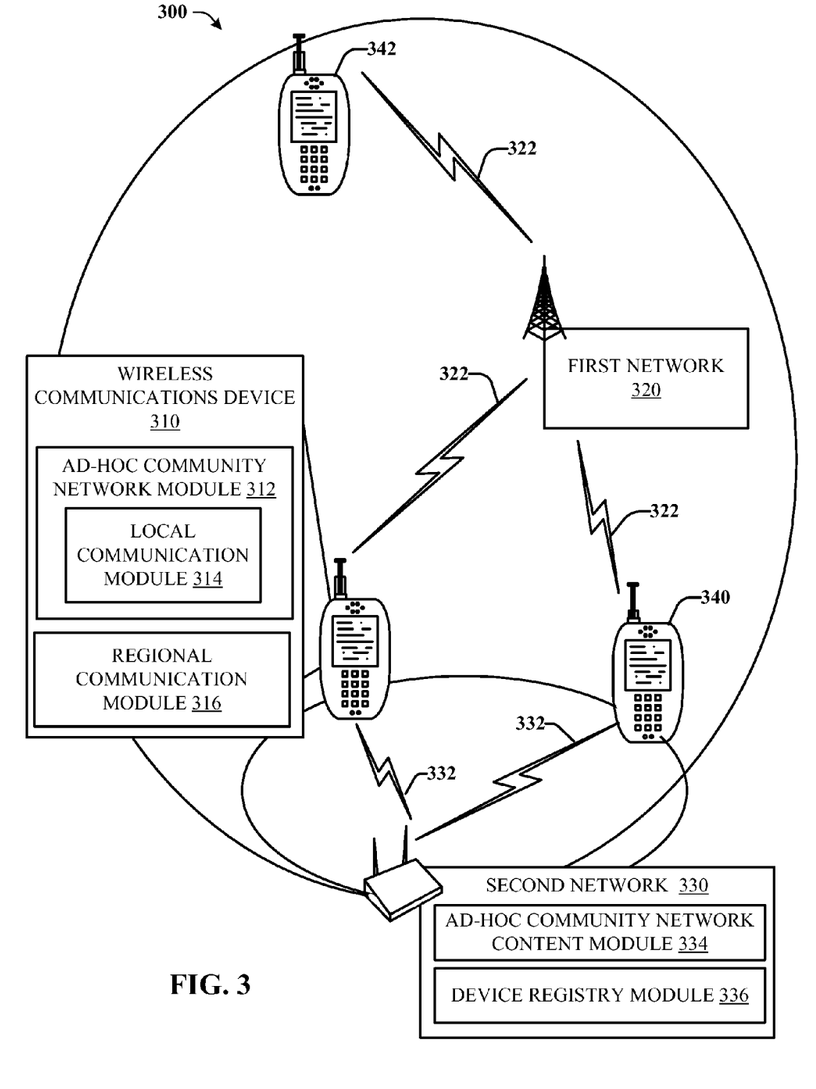
FIG. 3 illustrates a block diagram of an ad-hoc communication network according to an aspect.

While still referencing FIG. 1, but turning also now to FIG. 3, an example block diagram of an ad-hoc communication network 330 within a wireless communication system 300 according to an aspect is illustrated. As depicted in FIG. 3, wireless communication system 300 may include multiple networks (320, 330) that facilitate communication between a plurality of wireless communications devices (WCDs) (e.g. 310, 340, 342) using one or more communication protocols (e.g. 322, 332). Further, in the depicted aspect, the multiple networks may be used contemporaneously by the WCDs) to facilitate access to various content, communications paths, etc., that may not be readily available through a single network. Further, the WCDs (310, 340, 342) may include ad-hoc community network module 312 that is operable to access a local ad-hoc community network. In one aspect, ad-hoc community network module 312 may further include local communication module 314 to facilitate communications on the local ad-hoc community network through the second network 330 using a second protocol 332. Further, ad-hoc community network module 312 may access ad-hoc community content through the second network 330 ad-hoc community content module 334. For example, where an ad-hoc community network is set up at a sporting event, ad-hoc community content module 334 may include in-depth player profile information, links to team, venue, etc., affiliated charities, sponsors, etc. In another aspect, the WCDs (310, 340, 342) may include regional communication module 316 that is operable to access first network 320 network using first protocol 322.

In one aspect, second network 330 may further include device registry module 346 that is operable to monitor WCDs accessing the second network based ad-hoc community network. In one aspect, device registry module 336 may allow WCDs accessing the ad-hoc community network access to information associated with other WCDs accessing the ad-hoc community network.

By way of example and not in limitation, in operation, WCD 310 may use ad-hoc community network module 312 to access an ad-hoc community network 320 while attending an event at a venue. Upon receiving access to the ad-hoc community network 320, WCD 310 may obtain ad-hoc community content 334 and information relating to other devices 340 accessing the ad-hoc community network through device registry module 336. In one aspect, WCD 310 may communicate with WCD 340 using a first protocol 322 through a first network 320 while contemporaneously obtaining content from ad-hoc network 330 using a second protocol. As such, two or more users at the same venue may access the local content and form an ad-hoc community while communicating with each other using instant messaging, texting, voice, etc. Additionally or in the Alternative, WCD 310 may use the communication protocols offered by either the first network (e.g. WWAN) or the second network (e.g. WLAN) to communicate with a remote WCD 342 and share local content with the remote WCD 342. In one aspect, such contemporaneous use of multiple protocols may be facilitated through a WCD extended program guide.

Figure 4:
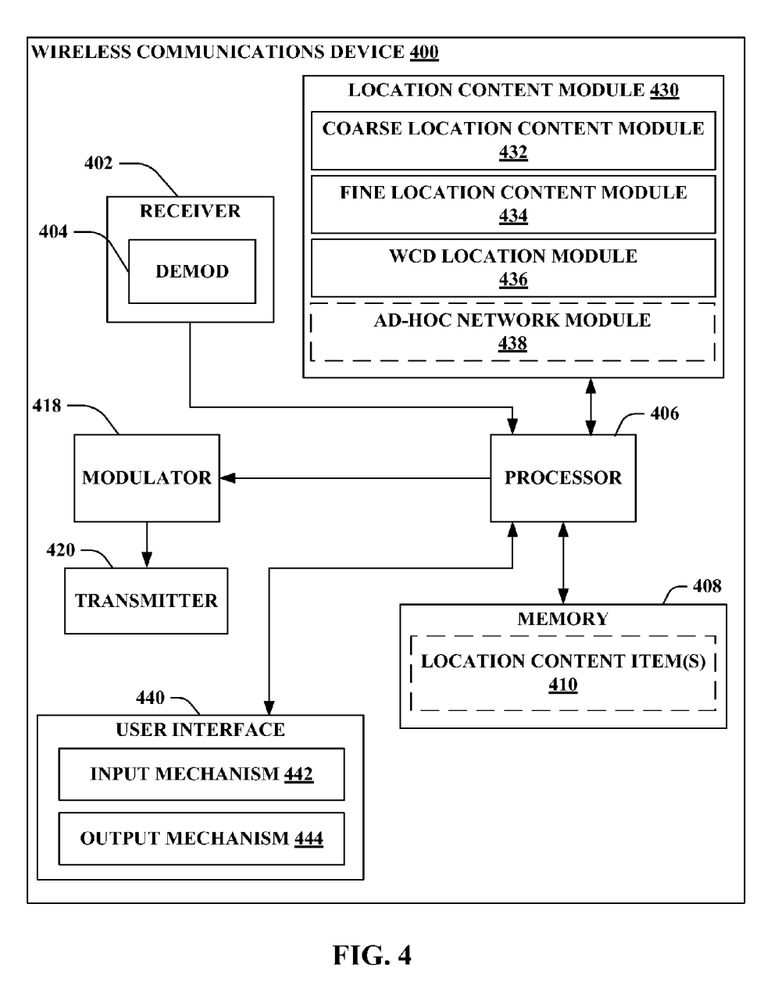
FIG. 4 illustrates a block diagram example architecture of a wireless communications device.

While still referencing FIG. 1, but turning also now to FIG. 4, an example architecture of wireless communications device 110 is illustrated. As depicted in FIG. 4, wireless communications device 400 comprises receiver 402 that receives a signal from, for instance, a receive antenna (not shown), performs typical actions on (e.g., filters, amplifies, downconverts, etc.) the received signal, and digitizes the conditioned signal to obtain samples. Receiver 402 can comprise a demodulator 404 that can demodulate received symbols and provide them to processor 406 for channel estimation. Further, receiver 402 may receive signals from multiple networks using multiple communication protocols. In one aspect, receiver 402 may receive a signal from a WWAN using at least one of: CDMA, WCDMA, TDMA, TD-SCDMA, UMTS, IP, GSM, LTE, WiMax, UMB, EV-DO, etc. In another aspect, receiver 402 may receive a signal from a WLAN using at least one of: 802.xx wireless LAN, or BLUETOOTH, etc.

Processor 406 can be a processor dedicated to analyzing information received by receiver 402 and/or generating information for transmission by transmitter 420, a processor that controls one or more components of wireless communications device 400, and/or a processor that both analyzes information received by receiver 402, generates information for transmission by transmitter 420, and controls one or more components of wireless communications device 400.

Wireless communications device 400 can additionally comprise memory 408 that is operatively coupled to processor 406 and that can store data to be transmitted, received data, information related to available channels, data associated with analyzed signal and/or interference strength, information related to an assigned channel, power, rate, or the like, and any other suitable information for estimating a channel and communicating via the channel. Memory 408 can additionally store protocols and/or algorithms associated with estimating and/or utilizing a channel (e.g., performance based, capacity based, etc.). In one aspect, memory 408 may include location content items 410. In such an aspect, location content items 410 may include information obtained from a location content network, such as first network server 120, second network server 140, third network server 150, etc. In one aspect, such information may have been obtained from a network and stored for later access. In such an aspect, storage of location content may include temporary caching, and/or more permanent storage options. Such options may be user defined, a default setting on WCD 400, network defined, etc.

It will be appreciated that the data stores (e.g., memory 408) described herein may be embodied by any non-transitory medium and may comprise either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 408 of the subject systems and methods may comprise, without being limited to, these and any other suitable types of memory.

Wireless communications device 400 can further location content module 430 to facilitate obtaining location content from multiple networks for use on the WCD 400. Location content module 430 may include coarse location content module 432, fine location content module 434, and WCD location module 436. In one aspect, coarse location content module 432 may be operable for obtaining: regional event information, regional map information, regional weather information, regional traffic information, etc. In one aspect, fine location content module may be operable for obtaining: specific event information, local map information, specific weather event information, specific traffic event information, etc. In one aspect, WCD location module 436 may be operable for: receiving the WCD location information from a location sensor associated with the WCD, receiving the WCD location information from a user input, requesting the WCD location information from the first network, receiving the requested WCD location information, etc.

In one aspect, location content module 430 may further include ad-hoc network module 438. In such an aspect, ad-hoc network module 438 may be operable for: receiving from a second network, access to an ad-hoc community network which uses the second protocol, accessing the ad-hoc community network using the second protocol, receiving ad-hoc community content using the second protocol, and transmitting at least a portion of the ad-hoc community content to a third party using the first protocol. For example, a user may access an ad-hoc network at a sporting event using a WLAN based network, download an image from the ad-hoc network and send the image to a remote user not at the sporting event over a WWAN based network. In another aspect, ad-hoc network module 438 may be operable for contemporaneously obtaining content from multiple networks. In such an aspect, ad-hoc network module 438 may allow a WCD 400 to access fine location content using a local second network while communicating voice, data, etc., with other devices using a first network.

Additionally, wireless communications device 400 may include user interface 440. User interface 440 may include input mechanisms 442 for generating inputs into communications device 400, and output mechanism 442 for generating information for consumption by the user of the communications device 400. For example, input mechanism 442 may include a mechanism such as a key or keyboard, a mouse, a touch-screen display, a microphone, etc. Further, for example, output mechanism 444 may include a display, an audio speaker, a haptic feedback mechanism, a Personal Area Network (PAN) transceiver etc. In the illustrated aspects, the output mechanism 444 may include a display operable to present media content that is in image or video format or an audio speaker to present media content that is in an audio format.

In operation, wireless communication device 400 may obtain, through location content module 430, coarse location content module 432, in which the coarse location content module 432 may include access information for one or more second networks accessible in specific geographic regions. Further, WCD location module 436 may obtain the location of the WCD 400. In the event that the WCD 400 is located in a geographic region in which access to a second network is available, the WCD 400 may use fine location content module 434 to access the second network and obtain fine location content. Thereafter, location content module 430 may integrate coarse and fine location content to generate an integrated location content item for access by a user.

Accordingly, wireless communications device 400 may obtain integrated coarse and fine location content for access by a user based at least in part on the location of WCD 400 and networks servicing the WCD 400.

Figure 5:
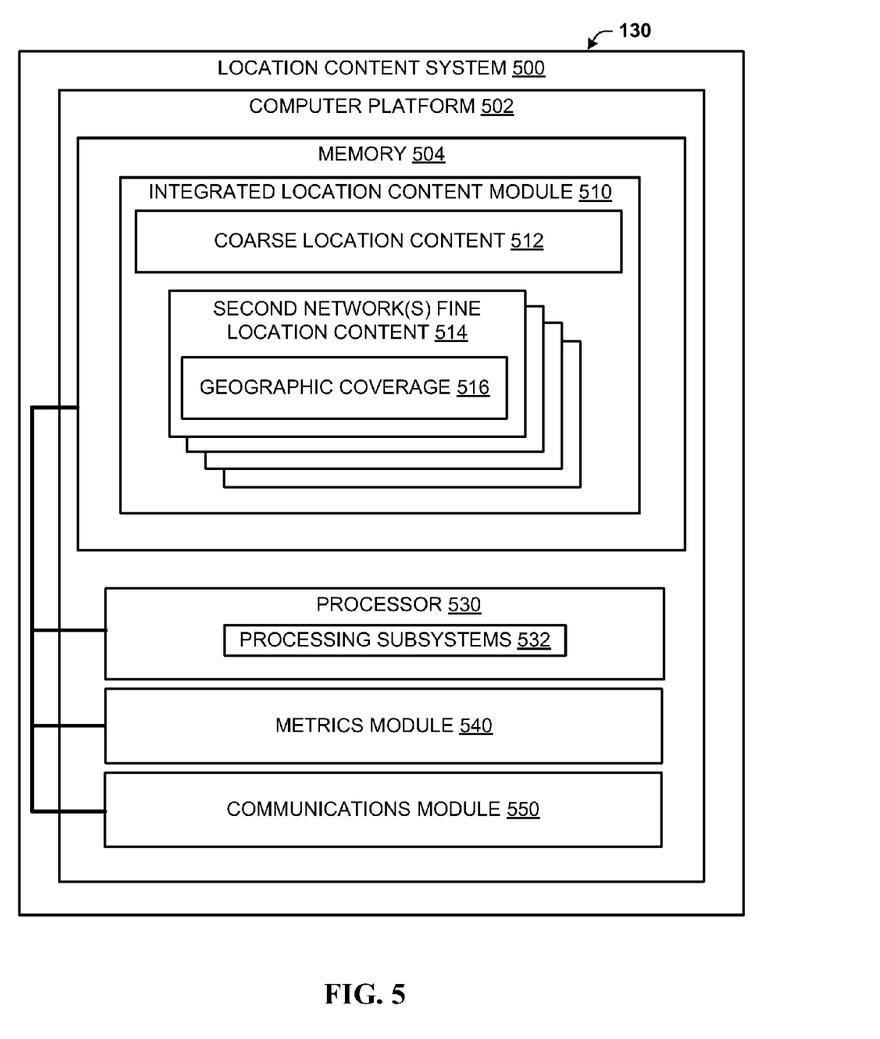
FIG. 5 illustrates exemplary block diagram of a location content system according to an aspect.

With reference to FIG. 5, illustrated is a detailed block diagram of location content system 500, such as first network server 120 depicted in FIG. 1. Location content system 500 may comprise at least one of any type of hardware, server, personal computer, mini computer, mainframe computer, or any computing device either special purpose or general computing device. Further, the modules and applications described herein as being operated on or executed by location content system 500 may be executed entirely on a single network device, as shown in FIG. 5, or alternatively, in other aspects, separate servers, databases or computer devices may work in concert to provide data in usable formats to parties, and/or to provide a separate layer of control in the data flow between communications device 110 and the modules and applications executed by location content system 500.

Location content system 500 includes computer platform 502 that can transmit and receive data across wired and wireless networks, and that can execute routines and applications. Computer platform 502 includes memory 504, which may comprise volatile and nonvolatile memory such as read-only and/or random-access memory (ROM and RAM), EPROM, EEPROM, flash cards, or any memory common to computer platforms. Further, memory 504 may include one or more flash memory cells, or may be any secondary or tertiary storage device, such as magnetic media, optical media, tape, or soft or hard disk. Further, computer platform 502 also includes processor 530, which may be an application-specific integrated circuit ("ASIC"), or other chipset, logic circuit, or other data processing device. Processor 530 may include various processing subsystems 532 embodied in hardware, firmware, software, and combinations thereof, that enable the functionality of media content distribution system 14 and the operability of the network device on a wired or wireless network.

Computer platform 502 further includes communications module 550 embodied in hardware, firmware, software, and combinations thereof, that enables communications among the various components of location content system 500, as well as between location content system 500, device 110, and second and third network servers (140, 150). Communication module 550 may include the requisite hardware, firmware, software and/or combinations thereof for establishing a wireless communication connection. According to described aspects, communication module 550 may include the necessary hardware, firmware and/or software to facilitate wireless broadcast, multicast and/or unicast communication of location content items, etc.

Computer platform 502 further includes metrics module 540 embodied in hardware, firmware, software, and combinations thereof, that enables metrics received from device 110, and/or second and third networks servers (140, 150) corresponding to, among other things, data communicated between device 110 and second and/or third network servers 140, 150. In one aspect, location content system 500 may analyze data received through metrics module 540 to modify data prepared for future distribution to device 110 and/or second and third networks servers (140, 150). For example, if the metrics module 540 returns data indicating the device is unable to access a second network associated with the second network server 140 within a geographic region said to be covered by the second network, then location content system 500 may update the coverage region for the second network accordingly.

Memory 504 of location content system 500 includes integrated location content module 510 operable for providing multiple layer location content to a WCD, such as device 110. In one aspect, integrated location content module 510 may include coarse location content 512, and one or more second network fine location content items 514. In one aspect, second network fine location content 514 may further include information relating to a geographic coverage region 516 for the second network. In operation, integrated location content module 510 may generate an integrated location content item from at least a portion of the coarse location content 512 and the one or more second network fine location content items using a process as described above with reference to FIG. 2. In one aspect, the integrated location content item may be transmitted to WCD 110, and/or second and third networks servers (140, 150), etc. In such an aspect, the integrated location content item may provide a WCD with coarse location content along with information detailing in which geographic regions additional fine location content may be accessed.

Figure 6:
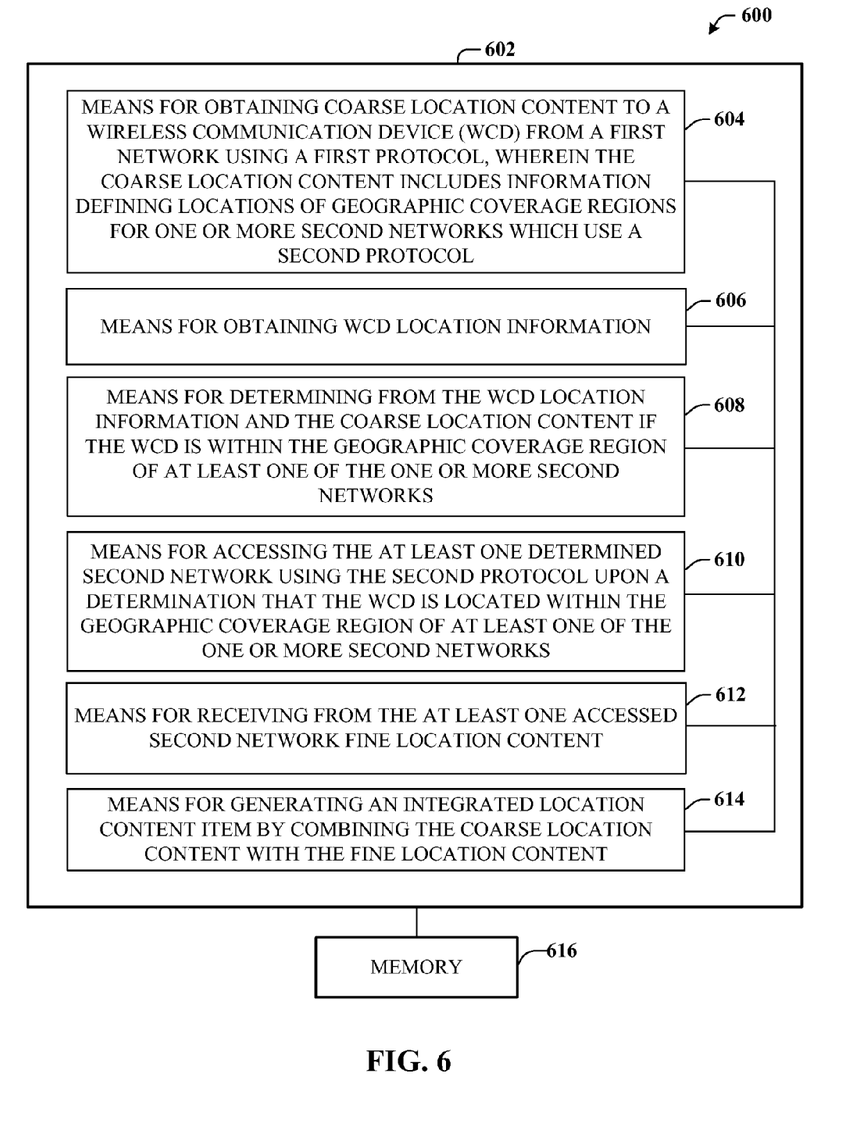
FIG. 6 illustrates a block diagram of an exemplary communications device that can obtain location content from multiple networks.

With reference to FIG. 6, a block diagram of an exemplary system 600 that can obtain location content from multiple networks is illustrated. For example, system 600 can reside at least partially within a wireless device. According to another example aspect, system 600 can reside at least partially within an access terminal. It is to be appreciated that system 600 is represented as including functional blocks, which can be functional blocks that represent functions implemented by a processor, software, or combination thereof (e.g., firmware). System 600 includes a logical grouping 602 of means that can act in conjunction. For instance, logical grouping 602 can include means for obtaining coarse location content at a wireless communication device (WCD) from a first network using a first protocol, wherein the coarse location content includes information defining locations of geographic coverage regions for one or more second networks which use a second protocol 604. In one aspect, obtaining coarse location information further may comprise receiving the coarse location content to the WCD periodically from the first network using a first protocol. In another aspect, obtaining coarse location information further may comprise: requesting, by the WCD, to the first network the coarse location content, and receiving the requested coarse location content from the first network using a first protocol. In yet another aspect, the coarse location content may further include at least one of: regional event information, regional map information, regional weather information, or regional traffic information. In still another aspect, the first protocol may include a WWAN protocol for a technology including: CDMA, WCDMA, TDMA, TD-SCDMA, UMTS, IP, GSM, LTE, WiMax, UMB, EV-DO, etc. In yet another aspect, the second protocol may include a WLAN protocol for a technology including: 802.xx wireless LAN, BLUETOOTH, etc.

Further, logical grouping 602 can comprise means for obtaining WCD location information 606. In one aspect, the obtaining WCD location information may further comprise at least one of: receiving the WCD location information from a location sensor associated with the WCD, receiving the WCD location information from a user input, requesting the WCD location information from the first network, or receiving the requested WCD location information. Further, logical grouping 602 can comprise means for determining from the WCD location information and the coarse location content if the WCD is within the geographic coverage region of at least one of the one or more second networks 608.

Further, logical grouping 602 can comprise means for accessing the at least one determined second network using the second protocol upon a determination that the WCD is located within the geographic coverage region of at least one of the one or more second networks 610. In one aspect, the accessing may further include: requesting access to the determined second network, wherein the request includes a WCD authentication identifying item, and receiving access to the determined second network by receiving an authenticated WCD authentication identifying item. Further, logical grouping 602 can comprise means for receiving fine location content from the at least one accessed second network 612. In one aspect, the fine location content may include at least one of: specific event information, local map information, specific weather event information, or specific traffic event information. In another aspect, the receiving may further comprise at least one of: receiving the fine location content real time or receiving the fine location content at a predetermined time, and caching the receiving fine location for later access. Further, logical grouping 602 can comprise means for generating an integrated location content item by combining the coarse location content with the fine location content 614. Additionally, system 600 can include a memory 616 that retains instructions for executing functions associated with the means 604, 606, 608, 610, 612 and 614. While shown as being external to memory 616, it is to be understood that one or more of the means 604, 606, 608, 610, 612 and 614 can exist within memory 616.

Figure 7:
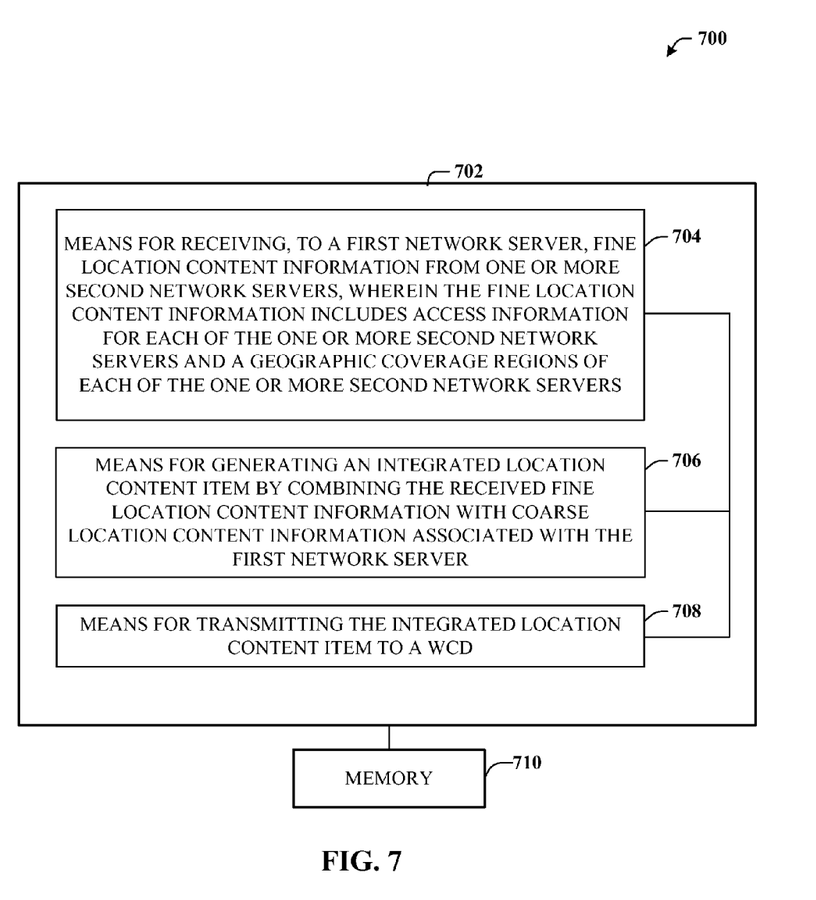
FIG. 7 illustrates a block diagram of an exemplary network device that can provide multiple layer location content to a WCD.

With reference to FIG. 7, a block diagram of an exemplary system 700 that can provide multiple layer location content to a WCD is illustrated. For example, system 700 can reside at least partially within a wireless device. According to another example aspect, system 700 can reside at least partially within an access terminal. It is to be appreciated that system 700 is represented as including functional blocks, which can be functional blocks that represent functions implemented by a processor, software, or combination thereof (e.g., firmware). System 700 includes a logical grouping 702 of means that can act in conjunction. For instance, logical grouping 702 can include means for receiving, to a first network server, fine location content information from one or more second network servers, wherein the fine location content information includes access information for each of the one or more second network servers and a geographic coverage region of each of the one or more second network servers 704. In one aspect, the coarse location content may further include at least one of: regional event information, regional map information, regional weather information, or regional traffic information. In another aspect, the fine location content may include at least one of specific event information, local map information, specific weather event information, or specific traffic event information. Further, logical grouping 702 can comprise means for means for generating an integrated location content item by combining the received fine location content information with coarse location content information associated with the first network server 706. Further, logical grouping 702 can comprise means for means for transmitting the integrated location content item to a WCD 708. In one aspect, the transmitting may further comprise transmitting the coarse location content to the WCD periodically from the first network server using a first protocol. In such an aspect, the first protocol may include a WWAN using at least one of: CDMA, WCDMA, TDMA, TD-SCDMA, UMTS, IP, GSM, LTE, WiMax, UMB, EV-DO. Additionally, system 700 can include a memory 710 that retains instructions for executing functions associated with the means 704, 706 and 708. While shown as being external to memory 710, it is to be understood that one or more of the means 704, 706, 708 and 708 can exist within memory 710.

As used in this application, the terms "component," "module," "system" and the like are intended to include a computer-related entity, such as but not limited to hardware, firmware, hardware under the control of software, or software stored in a non-transitory medium. For example, a component may be, but is not limited to being, a process running on a processor, a processor, a computer, and/or a non-transitory medium storing an object, an executable, a thread of execution, or a program. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in any non-transitory storage medium including RAM memory, flash memory, ROM memory, EPROM memory, EEPROM memory, registers, a hard disk, a removable disk, a CD-ROM. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a non-transitory storage medium.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for obtaining location content from multiple communication networks, the method comprising:

obtaining coarse location content from a first communication network using a first protocol, wherein the coarse location content includes information defining locations of geographic coverage regions for one or more second communication networks associated with a second protocol;

obtaining location information of a wireless communications device;

determining, by the wireless communications device, that the wireless communications device is within a geographic coverage region of the geographic coverage regions for the one or more second communication networks based on the obtained location information of the wireless communications device and the obtained coarse location content;

accessing at least one second communication network of the one or more second communication networks using the second protocol in response to the determining that the wireless communications device is located within the geographic coverage region;

receiving fine location content from the accessed second communication network; and generating an integrated location content item that combines the obtained coarse location content with the received fine location content.

2. The method of claim 1 further comprises:
accessing the integrated location content item generated by the wireless communication device through a user interface.

3. The method of claim 2, further comprising:
accessing an ad-hoc community network through the at least one accessed second communication network using the second protocol;
receiving ad-hoc community content using the second protocol; and
transmitting at least a portion of the ad-hoc community content to a third party using the first protocol.

4. The method of claim 1, wherein the obtaining coarse location content further comprises:
receiving the coarse location content at the wireless communication device periodically from the first communication network using the first protocol.

5. The method of claim 1, wherein the obtaining coarse location content further comprises
requesting the coarse location content from the first communication network.

6. The method of claim 1, wherein the obtained coarse location content further includes at least one of: regional event information, regional map information, regional weather information, or regional traffic information.

7. The method of claim 1, wherein the first protocol includes a WWAN protocol for a technology comprising at least one of: CDMA, WCDMA, TDMA, TD-SCDMA, UMTS, IP, GSM, LTE, WiMax, UMB, or EV-DO.

8. The method of claim 1, wherein the second protocol includes a WLAN protocol for a technology comprising at least one of: 802.xx wireless LAN, or BLUETOOTH.

9. The method of claim 1, wherein the obtaining the location information of the wireless communications device further comprises at least one of:

receiving the location information from a location sensor associated with the wireless communications device,
receiving the location information from a user input, or
requesting the location information from the first communication network and
receiving the requested location information.

10. The method of claim 1, wherein the accessing of the at least one second communication network using the second protocol further comprises:
requesting access to the at least one second communication network, wherein the request includes an authentication identifying item; and
receiving access to the at least one second communication network by receiving an authentication for the authentication identifying item.

11. The method of claim 1, wherein the received fine location content includes at least one of: specific event information, local map information, specific weather event information, or specific traffic event information.

12. The method of claim 1, wherein the receiving fine location content further comprises:
receiving the fine location content one of: in real time, or at a predetermined time; and
caching the received fine location content for later access.

13. A computer program product, comprising:
a non-transitory computer-readable medium comprising:
a first set of codes for causing a computer to obtain coarse location content from a first communication network using a first protocol, wherein the coarse location content includes information defining locations of geographic coverage regions for one or more second communication networks associated with a second protocol;
a second set of codes for causing the computer to obtain location information of a wireless communications device;
a third set of codes for causing the computer to determine, by the wireless communications device, that the wireless communications device is within a geographic coverage region of the geographic coverage regions for the one or more second communication networks based on the obtained location information of the wireless communications device and the obtained coarse location content;
a fourth set of codes for causing the computer to access at least one second communication network using the second protocol in response to the determining that wireless communications device is located within the geographic coverage region;
a fifth set of codes for causing the computer to receive fine location content from the at least one accessed second communication network; and
a sixth set of codes for causing the computer to generate an integrated location content item that combines the obtained coarse location content with the received fine location content.

* * * * *